(12) United States Patent
Tenzer et al.

(10) Patent No.: US 7,877,198 B2
(45) Date of Patent: Jan. 25, 2011

(54) SYSTEM AND METHOD FOR IDENTIFYING FUEL SAVINGS OPPORTUNITY IN VEHICLES

(75) Inventors: Stephen Tenzer, Prior Lake, MN (US); Benjamin J. Nielsen, Lakeville, MN (US); Jon Passman, Minnetonka, MN (US)

(73) Assignee: General Electric Company, Schenectady, NY (US)

( * ) Notice: Subject to any disclaimer, the term of this patent is extended or adjusted under 35 U.S.C. 154(b) by 1116 days.

(21) Appl. No.: 11/337,399

(22) Filed: Jan. 23, 2006

(65) Prior Publication Data

US 2007/0174004 A1    Jul. 26, 2007

(51) Int. Cl.
   *G06F 19/00*    (2006.01)
(52) U.S. Cl. .................. 701/123; 701/1; 701/29; 701/112; 701/114; 123/339.17; 123/339.23; 123/339.28; 340/439; 340/450
(58) Field of Classification Search ............... 701/123, 701/112, 29; 340/439, 450
   See application file for complete search history.

(56) References Cited

U.S. PATENT DOCUMENTS

| | | | |
|---|---|---|---|
| 4,406,262 A * | 9/1983 | Ikeura | 123/339.17 |
| 5,394,136 A | 2/1995 | Lammers et al. | |
| 5,442,553 A | 8/1995 | Parrillo | |
| 5,758,300 A | 5/1998 | Abe | |
| 5,797,134 A | 8/1998 | McMillan et al. | |
| 5,816,491 A | 10/1998 | Berkeley et al. | |
| 6,064,970 A | 5/2000 | McMillan et al. | |
| 6,092,021 A * | 7/2000 | Ehlbeck et al. | 701/123 |
| 6,295,492 B1 | 9/2001 | Lang et al. | |
| 6,356,205 B1 | 3/2002 | Salvo et al. | |
| 6,594,579 B1 * | 7/2003 | Lowrey et al. | 701/123 |
| 6,714,857 B2 | 3/2004 | Kapolka et al. | |
| 6,801,841 B2 | 10/2004 | Tabe | |
| 6,988,033 B1 * | 1/2006 | Lowrey et al. | 701/123 |
| 2002/0116261 A1 | 8/2002 | Moskowitz et al. | |
| 2003/0130975 A1 * | 7/2003 | Muller | 706/50 |
| 2004/0104345 A1 | 6/2004 | Kansakoski et al. | |
| 2004/0157650 A1 | 8/2004 | Wissinger et al. | |
| 2005/0021222 A1 * | 1/2005 | Minami et al. | 701/123 |
| 2005/0088321 A1 * | 4/2005 | Weber | 340/988 |
| 2005/0102073 A1 | 5/2005 | Ingram, II et al. | |
| 2005/0119821 A1 * | 6/2005 | Malone et al. | 701/112 |
| 2005/0137763 A1 | 6/2005 | Watkins et al. | |
| 2005/0203816 A1 * | 9/2005 | Monsor et al. | 705/31 |

(Continued)

*Primary Examiner*—Khoi Tran
*Assistant Examiner*—Jonathan Sample
(74) *Attorney, Agent, or Firm*—Drinker, Biddle & Reath LLP

(57) ABSTRACT

A system and method of identify fuel savings opportunity in a fleet of vehicles based on a determination of fuel consumption due to modifiable use conditions is described. Modifiable use conditions, such as unauthorized usage, speeding and excessive idling, which represent opportunities for fuel savings are identified and fuel consumption based on the modifiable use conditions is determined. A user-defined statistical metric for the fleet, or a portion of the fleet, can be determined for each of the modifiable use conditions evaluated. Fuel consumption of an individual vehicle, or a group of vehicles, resulting from modifiable use conditions can be compared with a larger group of vehicle, or the fleet, to determine vehicles which correspond to a metric of the fleet. Fleet managers can use this information to modify the use conditions of individual or group of vehicles to provide fuel savings for the fleet.

45 Claims, 2 Drawing Sheets

U.S. PATENT DOCUMENTS

| | | | |
|---|---|---|---|
| 2005/0209771 A1* | 9/2005 | Ishiguro | 701/123 |
| 2005/0288850 A1* | 12/2005 | Sato | 701/123 |
| 2006/0179019 A1* | 8/2006 | Bradski | 706/20 |
| 2007/0135988 A1* | 6/2007 | Kidston et al. | 701/102 |
| 2007/0213920 A1* | 9/2007 | Igarashi et al. | 701/114 |

\* cited by examiner

FIG. 1. Block Diagram Representation of a System for Identifying Fuel Savings Opportunity in a Fleet of Vehicles
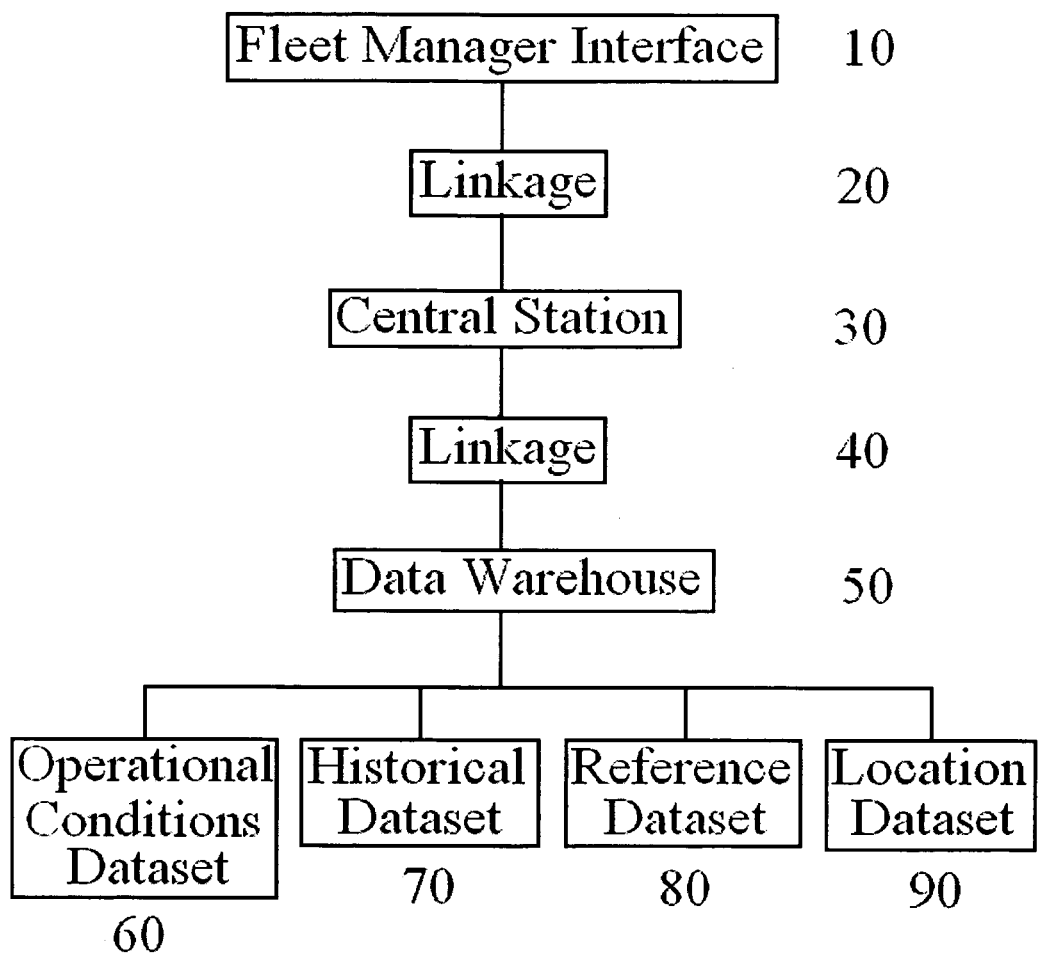

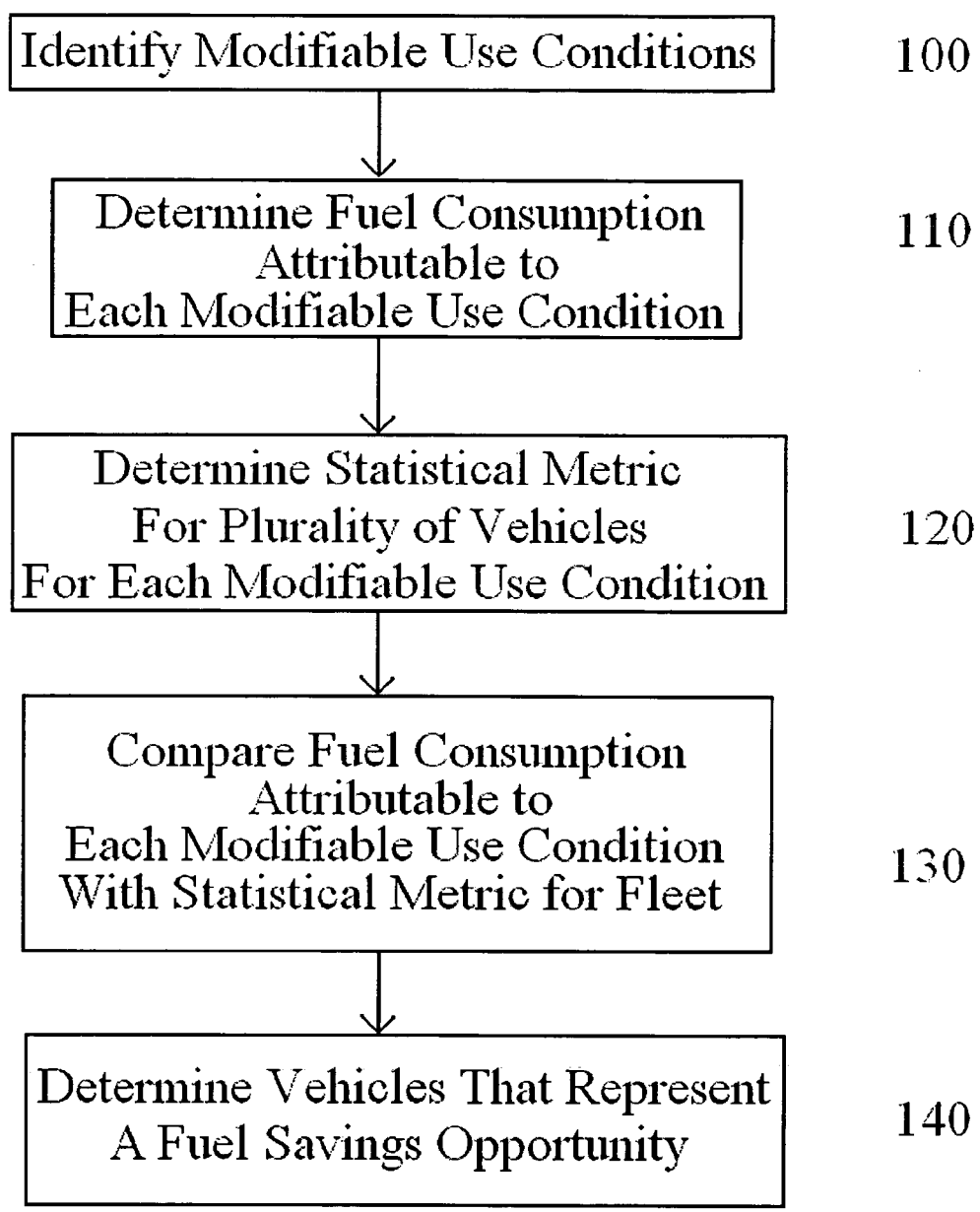
FIG. 2. Block Diagram Representation of a Method for Identifying Fuel Savings Opportunity in a Fleet of Vehicles

US 7,877,198 B2

SYSTEM AND METHOD FOR IDENTIFYING FUEL SAVINGS OPPORTUNITY IN VEHICLES

FIELD OF THE INVENTION

This invention relates to a system and method for identifying fuel savings opportunity in vehicles by monitoring and analyzing modifiable use conditions of vehicles individually or within the fleet.

BACKGROUND OF THE INVENTION

Companies that use fleets of vehicles are subject to inefficient use and misuse of their fleet vehicles. For example, it is likely that some vehicles in a fleet will be used by employees without authorization. Even employees who are authorized to use a vehicle for some purposes may, in some instances, deviate from an authorized or prescribed route or otherwise make an unauthorized use of the vehicle. Even when vehicles are used for business purposes, the manner of use often results in unnecessary fuel consumption. For example, several maintenance related items, such as driving the vehicle without a properly tuned engine, driving the vehicle with tire pressure outside recommended ranges, and using a grade of motor oil that is not recommended for the vehicle, all contribute to inefficient fuel use, and increased costs. In addition, it is common for a vehicle operator to leave the vehicle idling while making deliveries or performing service, especially in extremes of temperature where the vehicle heater or air-conditioner is used, which contributes to inefficient fuel use. Also, when a vehicle is driven at higher speeds or is driven with a weight load higher than is needed, there is inefficient fuel consumption.

Fuel consumption can also occur at higher levels when the management of a fleet is not done in an efficient manner. For example, vehicle scheduling that does not consider factors affecting fuel economy, such as a schedule that requires a vehicle to make consecutive service stops at opposite ends of a service area when a service stop that is closer is available, can result in higher fuel consumption levels. Similarly, vehicle routing for the vehicle that does not consider factors affecting fuel economy, such as using routes that increase either the time or distance required to be driven between service stops, can also result in higher fuel consumption.

General concepts of how to reduce fuel consumption in individual vehicles are widely known. For example, the U.S. Department of Energy and the U.S. Environmental Protection Agency co-sponsor a website www.fueleconomy.gov that provides tips on improving gas mileage in the areas. These tips are in the areas of driving more efficiently, keeping your car in shape, planning and combining trips and choosing a more efficient vehicle. Examples of the amounts of potential fuel savings obtained from the web-site are given below.

| Driving More Efficiently | |
|---|---|
| Driving Sensibly | 5-33% |
| Observing Speed Limit | 7-23% |
| Remove Excessive Weight | 1-2% per 100 lbs |
| Keeping Your Car in Shape | |
| Keeping Vehicle Properly Tuned | 4% |
| Check and Replace Air Filters Regularly | Up to 10% |
| Keep Tires Properly Inflated | Up to 3% |
| Use Recommended Grade of Motor Oil | 1-2% |

Information on reducing fuel consumption by reducing heavy vehicle idling is given at http://www.transportation.ani.gov/research/technologyanalysis/idling.html. Long-haul trucks typically idle 6 hours per day, or 1,830 hours per year, but actual practice varies, from idling 1-2 nights per week to hardly ever turning the engine off. Additionally, each year, about 20 million barrels of diesel fuel are consumed by idling long-haul trucks. Estimated truck emissions total about 10 million tons of $CO_2$, 50,000 tons of nitrogen oxides, and 2,000 tons of particulates. It is also estimated that the percentage of total fuel saved increases with the number of idling hours avoided.

Additional information on reducing fuel consumption by reducing heavy vehicle idling is given at http://www.cleanairfleets.org/idling.html, where it is stated: "For most on-road, heavy-duty fleets, idling can account for more than 50 percent of total trip time. The amount of diesel fuel burned, the emissions produced, and the maintenance impacts to trucks owners are significant. Consider the following:

A class 8 truck typically idles 8 hours per night, 300 nights per year (2,400 hours per year).

Each year a truck emits over 0.3 tons of nitrogen oxide (NOx) and 21 tons of carbon dioxide ($CO_2$).

A typical diesel vehicle burns one gallon of fuel for every hour of idling.

Idling trucks collectively burn away 1.2 billion gallons of diesel fuel annually at a cost of more than one trillion dollars to the industry.

A truck idling for one hour suffers wear and tear equivalent to being driven seven miles. (ATA Technology and Maintenance Council)

Operating life of engine oil is reduced by 75 percent due to prolonged idling—from 600 engine hours to 150 engine hours."

The inefficient use of vehicles therefore results in higher fuel consumption than is needed and results in increased operating costs. One way to reduce these problems is to identify use conditions of vehicles in the fleet that can be modified to reduce fuel consumption.

Numerous methods exist for routing and scheduling the movement of vehicles in a fleet. Such methods can enable a fleet manager to use vehicles in the fleet in an efficient manner, usually related to man-power costs. The addition of fuel consumption determinations to such systems provides opportunities to identify fuel consumption savings.

Accordingly, there is a need for a system and method of identifying modifiable use conditions of vehicles in a fleet that represent a fuel savings opportunity.

SUMMARY OF THE INVENTION

Accordingly, the present invention is directed to a system and method of using information on the operation of individual vehicles within a fleet to identify modifiable use conditions that represent a fuel savings opportunity. This system and method substantially obviates one or more of the problems due to limitations and disadvantages of the related art.

An object of the present invention is to provide a system and method of identifying and examining use conditions of vehicles to reduce fuel consumption, thereby providing a cost savings opportunity for the fleet. An object of the present invention is to provide a system and method of analyzing an individual vehicle to identify fuel savings opportunities due to modifiable use conditions of the vehicle. Another object of the present invention is to provide a system and method of identifying fuel savings opportunities at the fleet level due to modifiable use conditions of vehicles within the fleet.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system and methods are provided that identify opportunities for fuel savings due to modifiable use conditions of the vehicles. A system and methods are also provided for determining the relative fuel savings opportunities of different modifiable use conditions. Methods are also provided for identifying changes in fuel savings opportunities over time.

It is to be understood that both the foregoing general description and the following detailed description are exemplary and explanatory and are intended to provide further explanation of the invention as claimed.

DESCRIPTION OF DRAWINGS

FIG. 1 is a block diagram representation of a system for identifying fuel savings opportunity in a fleet of vehicles in an embodiment of the present invention.

FIG. 2 is a schematic representation of the steps in a method of identifying fuel savings opportunity in a fleet of vehicles using an embodiment of the present invention.

DETAILED DESCRIPTION OF THE PREFERRED EMBODIMENTS

Reference will now be made in detail to an embodiment of the present invention, example of which is illustrated in the accompanying drawings.

The term fleet can encompass a plurality of vehicles owned, or used, by a common entity. The term can encompass a plurality (but not all) of vehicles in the fleet, or all of the vehicles in the fleet. For example, vehicle within a fleet may be divided into geographical regions. The use of the terms fleet can encompass a collection of vehicles within a region.

FIG. 1 illustrates a block diagram of a representative system for identifying fuel savings opportunity in a fleet of vehicles. The system comprises a fleet manager interface 10 with linkage 20 to central station 30 which contains, or is linked through linkage 40 to, data warehouse 50. Data warehouse 50 comprises at least one operational conditions dataset 60 and at least one positional dataset 90 for fleet vehicles 90. The data warehouse may further comprise historical datasets 70, reference datasets 80, and other information related to the fleet.

Fleet manager interface 10 represents a desktop computer, a laptop computer, workstation, handheld device, or other such device for interacting with a central station 30. Linkage 20 between fleet manager interface 10 and central station 30 may be through a communications network (which may a wired or wireless LAN, WAN, internet, extranet, peer-to-peer network, cellular or satellite transmission network), or through other such devices that allow for the transmission of information between the fleet manager interface and the central station. Central station 30 may comprise a single computer/workstation, multiples computers/workstations, servers, routers, storage devices, and combinations thereof, and associated software. Linkage 40 between central station 30 and data warehouse 50 may be through a communications network (which may a wired or wireless LAN, WAN, internet, extranet, peer-to-peer network, cellular or satellite transmission network), or through other such devices that allow for the transmission of information between the central station and the data warehouse. Calculations can be performed by any computer, server or process within central station 30 and data warehouse 50.

Data warehouse 50 comprises at least one server, storage medium or combination thereof. These devices may be located at one, or multiple facilities and may be directly linked or linked through a network. Data warehouse 50 comprises datasets, or databases, of information that describes the operational conditions 60 of individual vehicles during daily activities and may include at least one dataset describing operational characteristics of the fleet, or portions of the fleet. Operational data on individual vehicles may be processed data based on raw data from sensors on a vehicle, or calculated data derived from either raw or processed data. Examples of operational data may include, but is not limited to, vehicle speed, position of ignition switch, distance traveled, tire pressure, and fuel consumption.

Data warehouse 50 may contain historical datasets 70 based on previously available data on individual vehicles, portions of the fleet, or the entire fleet. The historical data may describes the operational conditions of individual vehicles, portions of the fleet or the entire fleet during daily activities and may include at least one dataset describing operational characteristics of the fleet, or portions of the fleet.

Data warehouse 50 may contain at least one reference dataset 80 comprising information related to fuel consumption under operating conditions. For example, the information may include information from secondary sources, such as the EPA web site noted above, vehicle manufacturers, and research papers and conference reports concerning fuel consumption and any other secondary source containing information on fuel consumption.

Data warehouse 50 comprises at least one positional dataset 90, that comprises information on the geographical location of vehicles within the fleet over time. The geographical location can be obtained by a variety of methods, including a locator that uses a position determining system, such as the Global Positioning System (GPS), Differential GPS (DGPS), Eurofix DGPS, and the Global Navigation Satellite System (GLONASS). Importantly, the present invention is well-suited to use any position determining system (both terrestrial and satellite based) as well as future systems that may be developed, and is not dependent on the use of a particular system.

In an embodiment, data warehouse 50 further comprises a geo-fence, or set of geo-fences, established relative to travel routes. Methods of establishing geo-fences are well known to those skilled in the art. Geo-fences may be permanently stored in the data warehouse 50, or be calculated by a computer within, or connected to the central station 30.

FIG. 2 is a block diagram representation of a method for identifying fuel savings opportunity in a fleet of vehicles. Modifiable use conditions are identified 100. Modifiable use conditions are operational conditions of the vehicle that are related to fuel usage and, when modified, have the potential to result in fuel savings. Examples of modifiable use conditions include, but are not limited to: driving a vehicle at a speed exceeding a defined speed, idling a vehicle, driving a vehicle with tire pressure outside a defined range, driving a vehicle without a properly tuned engine, driving a vehicle that is using a grade of motor oil that is not recommended for the vehicle, driving a vehicle with weight in excess of a defined weight, unauthorized use of a vehicle outside of set working times, unauthorized use of a vehicle outside of set locations, driving a vehicle according to a schedule that is not optimized to consider factors affecting fuel economy, driving a vehicle according to routing that is not optimized to consider factors affecting fuel economy, and driving a vehicle in deviation from routes that were optimized to consider factors affecting fuel economy.

After modifiable use conditions are identified 100, fuel consumption attributable to each modifiable use condition is determined 110. Fuel consumption may be either measured or estimated. Measured or estimated fuel consumption may be determined by a variety of methods. Methods of measuring fuel consumption include, but are not limited to, measurements obtained from: a flow meter of fuel moving into the engine; pressure in the fuel tank, where pressure is a measure of the quantity of fuel in the tank; and changes in the amount of fuel in the tank. Estimated fuel consumption may be calculated using secondary sources that provide estimates of fuel consumption for different types of uses such as speeding, idling and fuel transactions charged against a fuel card. When estimated fuel consumption is to be used, the fuel consumption can be calculated at the central station or an application server linked to the central station.

A user-defined statistical metric for a plurality of vehicles for each modifiable use condition can be determined 120. Methods of generating statistical metrics are well known to one skilled in the art. Examples of statistical metrics concerning the modifiable use condition of idling time can include, but are not limited to, mean, median, upper $90^{th}$ percentile, upper 95th percentile, and statistically significant outliers.

Comparing 130 the value for a modifiable use condition on each vehicle to the selected statistical metric for the same modifiable use condition from the fleet identifies 140 vehicles representing a fuel savings opportunity.

The relative opportunity for fuel savings between modifiable use conditions 150 can be determined by comparing the fuel saving opportunities for each modifiable use condition. For example, if modifiable use conditions of exceeding a set speed, idling, driving with tire pressure outside set range and using a routing system which does not consider fuel consumption result in fuel savings opportunity of 12.5, 25, 0.5 and 10 gallons of fuel per month (50 gallons per month total) are evaluated, 50% of the potential fuel saving is due to idling, while 25% is due to exceeding a set speed, 20% is due to a routing system which does not consider fuel consumption and 5% is due to driving with tire pressure outside a set range. Evaluation of the sources of potential savings can help prioritize or focus fuel savings efforts.

In an embodiment, fuel consumption for at least one modifiable use condition for each vehicle can be evaluated over time 160. In another embodiment, fuel consumption for each modifiable use condition for a plurality of fleet vehicles can be evaluated over time 170.

In another embodiment, fuel consumption can be converted 180 to a monetary value using the price of fuel. The price of fuel used can be actual prices paid for fuel, average fuel costs over a set period of time, or any other method used in business.

Use conditions in a vehicle may be adjusted 190 using a variety of methods as appropriate to reduce fuel consumption. Methods of modifying use conditions on a vehicle can be applied to individual vehicles or groups of vehicles. Examples of such methods include, but are not limited to: driving a vehicle at a speed below a defined speed, reducing idling time, driving a vehicle with tire pressure within a defined range, driving a vehicle with a properly tuned engine, driving a vehicle that is using a grade of motor oil recommended for the vehicle, driving a vehicle with weight below a defined weight, authorized use of a vehicle, driving a vehicle according to a schedule that is optimized to consider factors affecting fuel economy, driving a vehicle according to routing that is optimized to consider factors affecting fuel economy, and driving a vehicle within routes that were optimized to consider factors affecting fuel economy.

Use conditions for the fleet of vehicles (as opposed for a single vehicle) may be adjusted 200 using a variety of methods. Examples of such methods include, but are not limited to: changing fleet operating procedures to require vehicle operators to check and maintain tire pressure within a set range, modifying scheduling procedures to consider fuel consumption, and modifying routing of the vehicles in the fleet to routes which are more fuel efficient.

Examples of fuel saving opportunities from identifying modifiable use conditions are given below. These examples are not exhaustive and are meant to demonstrate embodiments of the invention. Other modifiable use conditions can be encompassed.

Example 1

Speed of the Vehicle

Data warehouse 50 contains an operational conditions dataset 60 on all of the vehicles of the fleet. Contained within that dataset is the speed of each vehicle over time. Fleet management determines a defined speed against which comparisons of the vehicles speed are made. For example, fleet management sets a defined speed of 65 miles per hour (mph), the maximum speed limit within the travel area of its vehicles. The statistical metric to be used is all occurrences over the defined speed. For each vehicle, times when the 65 mph limit is exceeded are determined. The time period over which the vehicle exceeds the defined speed is determined from this dataset. Using information in a reference dataset 80 indicating, for example, that for each 5 mph increment of speed over 60 mph, average fuel consumption increases about 7%, the amount of excess fuel consumed can be calculated. This procedure determines excess fuel consumption on an individual basis. This calculation may be performed over a number of time periods including, but not limited to days, weeks, months or years.

In an embodiment, excess fuel consumption for the fleet may be calculated by determining the sum of the excess fuel consumption for each vehicle within the fleet which exceeded the set speed. In another embodiment, the dataset of speed of each vehicle can be aggregated to directly determine fuel consumption savings on the fleet level.

In another embodiment, excess fuel consumed can be more accurately calculated by evaluating the amount of time each vehicle exceeds the defined speed in defined blocks of speed, such as 5 mph increments. For example, if the defined speed is 65 mph, the amount of time the vehicle travels at 65-70 mph, 70-75 mph, 75-80 mph, etc. is determined. Using information in a reference dataset 80, such as that described above at www.fueleconomy.gov, indicating that for each 5 mph increment of speed over 60 mph, average fuel consumption increases about 7%, the amount of excess fuel consumed by a vehicle traveling at each successive 5 mph range can be determined. For example, the excess fuel consumption of a vehicle traveling at 70-75 mph can be determined by adding the excess fuel consumption while traveling at 65-70 mph to the excess fuel consumption while traveling at 70-75 mph.

Example 2

Idling of the Vehicle

Data warehouse 50 contains an operational conditions dataset 60 on all of the vehicles of the fleet. Contained within that dataset is information on the speed of each vehicle over time and the time when the engine is on. A vehicle is idling when the engine is on and the vehicle speed is 0 mph. For each vehicle, times when the engine is on and the vehicle speed is 0 mph are determined. The total amount of time the vehicle is idling and the total amount of time the engine is on is determined over a set period of time. Using information in a reference dataset 80, indicating that a vehicle uses a defined number of gallons of fuel for each hour idling, the amount of excess fuel consumed due to idling can be calculated. This procedure determines excess fuel consumption on an individual basis. This calculation may be performed over a number of time periods including, but not limited to days, weeks, months or years.

In an embodiment, excess fuel consumption for the fleet may be calculated by determining the sum of the excess fuel consumption for each vehicle. In another embodiment, the dataset of speed of each vehicle can be aggregated to directly determine fuel consumption savings on the fleet level.

In an embodiment, a user-defined statistical metric for the fleet is determined based on the percentage of time an individual vehicle idles. For example a user-defined statistical metric may be set at 40% of the time the vehicle is operating. In that case, all vehicles which idle more than 40% of their operating time are identified. In another embodiment, a user-defined statistical metric for the fleet is determined based on the upper $75^{th}$ percentile of excess fuel consumption by individual vehicle.

In an embodiment, use conditions of individual vehicles can be adjusted by identifying individual vehicles having excess fuel consumption due to idling in a quantity greater than the fleet metric and make operators aware of the potential fuel savings. In another embodiment, the operational characteristics of individual vehicles identified as having excess fuel consumption due to idling in a quantity greater than the fleet metric can be examined to determine if idling time of the vehicle has changed after vehicles were identified and operators were made aware of fuel saving opportunities, and desired fuel savings have occurred.

In an embodiment, the fleet manager may modify a use condition for the fleet by adjusting the allowable amount of time that each vehicle in the fleet is allowed to idle. In another embodiment, modifying the allowable amount of time that each vehicle is allowed to idle may be seasonally adjusted to allow for higher fuel consumption in winter, when heater usage may be needed, and in summer, when air conditioning usage may be needed.

Example 3

Driving a Vehicle with Tire Pressure Outside a Defined Range

Data warehouse 50 contains an operational conditions dataset 60 on all of the vehicles of the fleet. Contained within that dataset is information on tire pressure and miles driven for each vehicle over time. In an embodiment, information in the dataset comprises the pressure of each tire on the vehicle. In another embodiment, information in the dataset comprises a metric based on the pressure in the tires. In a further embodiment, information in the database comprises an indicator, such as yes or no, of the pressure in the vehicles tires being outside a set range.

In an embodiment, vehicles are selected if their tire pressure was outside a set range. In another embodiment, for each vehicle in the fleet the number of miles traveled by the vehicle while the pressure in its tires was outside a defined range is determined over a set period of time. This determination may be performed over a number of time periods including, but not limited to days, weeks, months or years. In an embodiment, a user-defined statistical metric is determined for the fleet based on the number of miles vehicles within the fleet were driven while tire pressure of the vehicle was outside a defined range. For example, if the statistical metric is any miles driven with tires pressure outside a defined range, all vehicles that drove any mileage with tire pressure outside the set range would be identified. In another embodiment, the mean number of miles vehicles within the fleet were driven while tire pressure of the vehicle was outside a defined range is determined. Vehicles driven with mileage in excess of that value are identified. In another embodiment, the total number of miles driven by the fleet is determined.

Using information in a reference dataset 80, indicating the increase in fuel consumption when a vehicle is driven with the tire pressure outside a desired range, the amount of excess fuel consumed by each vehicle can be determined. In another embodiment, the amount of excess fuel consumed by the fleet can be determined using a historical dataset where information is available on fuel consumption under acceptable tire pressure. This determination may be performed over a number of time periods including, but not limited to days, weeks, months or years.

In an embodiment, operators of individual vehicles identified as having excess fuel consumption due to driving while tire pressure is outside a set range can be made aware of the potential fuel savings. In another embodiment, the fleet manager may modify the amount of time vehicles within a fleet can drive on tires where the pressure is outside a determined range by requiring vehicle operators to check and, if necessary, adjust the vehicles tire pressure on a set basis.

Example 4

Driving a Vehicle without a Properly Tuned Engine

Data warehouse 50 contains an operational conditions dataset 60 on all of the vehicles of the fleet. Contained within that dataset is information related to the proper tuning of an engine. Examples of such information include, but are not limited to: alerts generated by the vehicle due to engine component malfunctions, the presence of a Malfunction Indication Light (MIL) signal, and daily fuel economy. In an embodiment, information in the dataset comprises the information on the presence of a Malfunction Indication Light (MIL) signal. In another embodiment, information in the dataset comprises a metric based on the presence of a Malfunction Indication Light (MIL) signal. In a further embodiment, information in the database comprises the presence of alerts generated by the vehicle due to engine component malfunctions.

For each vehicle in the fleet, the number of miles traveled by the vehicle while the engine is not properly tuned is determined over a set period of time. This determination may be performed over a number of time periods including, but not limited to days, weeks, months or years. In an embodiment, a user-defined statistical metric is determined for the fleet based on the number of miles vehicles within the fleet were driven while the engine in the vehicle was not properly tuned. In an embodiment, the mean number of miles vehicles within the fleet were driven while their engines were not properly tuned is determined. Vehicles driven with mileage in excess of that value are identified. In another embodiment, the total number of miles driven by the fleet while their engines were not properly tuned is compared to the total number of miles driven by the fleet. These determinations may be performed over a number of time periods including, but not limited to days, weeks, months or years.

In an embodiment, operators of individual vehicles identified as having excess fuel consumption due to driving while the engine is not properly tuned can be made aware of the potential fuel savings. In another embodiment, the operational characteristics of individual vehicles identified as having excess fuel consumption due to use of the vehicle can be monitored and, based on further monitoring, maintenance schedules for the identified vehicles may be adjusted. In another embodiment, the fleet manager may modify the amount of time vehicles within a fleet can drive while the engine is not properly tuned.

Example 5

Driving a Vehicle Using a Grade of Motor Oil not Recommended for the Vehicle

Data warehouse 50 contains an operational conditions dataset 60 and a historical conditions dataset 70 on all of the vehicles of the fleet. Contained within the operational dataset 60 is information on mileage driven by each vehicle over time. The dataset may also include such information as fuel economy over time. Contained within the historical dataset 70 is information on maintenance performed on each vehicle over time. In an embodiment, information in the dataset comprises the identification of materials changed during maintenance. In another embodiment the database further comprises data on the useable life of motor oil within the engine.

In an embodiment, the number of miles traveled by each vehicle in the fleet while the vehicle was using a grade of oil not recommended for the vehicle is determined over a set period of time. In another embodiment, the number of miles traveled by each vehicle while the useable life of motor oil within the vehicle is determined to be less than a set value is determined over a set period of time. This determination may be performed over a number of time periods including, but not limited to days, weeks, months or years.

In an embodiment, a user-defined statistical metric is determined for the fleet based on the number of miles vehicles within the fleet were driven while the vehicle used a grade of motor oil not recommended for the vehicle. The number of miles driven by a vehicle which used a grade of motor oil not recommended for the vehicle can be obtained based on maintenance records in a historical dataset 70 and mileage records of the vehicle over time in an operational condition dataset 60. In an embodiment, the metric of zero miles driven while the vehicle used a grade of motor is set. Using this metric, all vehicles driven while using a grade of motor oil not recommended are identified. In another embodiment, the total number of miles driven by the identified vehicles is determined.

Using information in a reference dataset 80, indicating the increase in fuel consumption when a vehicle is driven using a grade of motor oil not recommended for the vehicle, the amount of excess fuel consumed by each vehicle can be determined. In another embodiment, the amount of excess fuel consumed by the fleet can be determined. This determination may be performed over a number of time periods including, but not limited to days, weeks, months or years.

Using information in a reference dataset 80, indicating the increase in fuel consumption when a vehicle is driven using motor oil whose useable life has expired, the amount of excess fuel consumed by each vehicle can be determined. In another embodiment, the amount of excess fuel consumed by the fleet can be determined. This determination may be performed over a number of time periods including, but not limited to days, weeks, months or years.

In an embodiment, service providers and operators of individual vehicles identified as having excess fuel consumption due to driving the vehicle using a grade of motor oil not recommended for the vehicle can be made aware of the potential fuel savings.

In another embodiment, the fleet manager may modify maintenance scheduling of individual vehicles based on the time required to expend the useable life of the motor oil.

Example 6

Driving the Vehicle with Excess Weight

Data warehouse 50 contains an operational conditions dataset 60 on all of the vehicles of the fleet and at least one reference dataset 80 comprises information related to fuel consumption under operating conditions. Contained within the operational conditions dataset 60 is information on the weight of each vehicle and the distance traveled over time. Information contained within reference dataset 80 may comprise such information as the percent reduction in fuel economy per 100 lbs weight. Based on the type of vehicle and its intended usage, set weights for each vehicle may be determined.

The amount of excess fuel consumed from carrying excess weight can be determined from a variety of factors. For example, excess fuel consumption can be calculated from excess weight, fuel efficiency and miles driven carrying the excess weight. This procedure determines excess fuel consumption on an individual basis. This calculation may be performed over a number of time periods including, but not limited to days, weeks, months or years.

In an embodiment, excess fuel consumption for the fleet may be calculated by determining the sum of the excess fuel consumption for each vehicle. In another embodiment, the dataset of excess weight of each vehicle can be aggregated to directly determine fuel consumption savings on the fleet level.

In an embodiment, a user-defined statistical metric is determined for the fleet based on the excess fuel consumption of each vehicle within the fleet. In another embodiment, the metric of zero miles driven while the vehicle carries weight above a set value is used. Using this metric, all vehicles driven carrying weight above a set value are identified. In another embodiment, the total number of miles driven by the identified vehicles is determined.

In an embodiment, individual vehicles identified as having excess fuel consumption due to carrying excess weight can be made aware of the potential fuel savings. In another embodiment, the operational characteristics of individual vehicles identified as having excess fuel consumption due to carrying excess weight greater than the fleet metric can be examined to determine if carrying excess weight has changed and desired fuel savings have occurred. In an embodiment, the fleet manager may modify an allowable amount of weight that each vehicle in the fleet is allowed to carry.

Example 7

Unauthorized Use of the Vehicle Determined by Time of Use

Data warehouse 50 contains an operational conditions dataset 60 on all of the vehicles of the fleet. Contained within that dataset is information on the dates, times, miles driven and fuel economy (mpg) when a vehicle has been used. These may be indicated by a variety of indicators on the vehicle, including but not limited to when the ignition switch is in the on position, or when the vehicle is in motion. In one embodiment, authorized use times can be set by the fleet manager. In another embodiment, the authorized times are obtained from scheduling software that scheduled authorized times for each vehicle, where the schedules generated by the software are in the data warehouse or otherwise available to the central station or application server that performs the fuel calculations. For each vehicle, the dates and times when the vehicle is in use are compared to authorized dates and times. The total amount of miles driven by the vehicle during time not within the unauthorized use time is determined. Using information in the operational conditions dataset 60, the amount of excess fuel consumed due to unauthorized time-use can be calculated based on the number of miles driven during the non-authorized time and the fuel economy (mpg) of the vehicle. This procedure determines excess fuel consumption on an individual basis. This calculation may be performed over a number of time periods including, but not limited to days, weeks, months or years.

In an embodiment, excess fuel consumption for the fleet may be calculated by determining the sum of the excess fuel consumption for each vehicle. In another embodiment, the dataset of speed of each vehicle can be aggregated to directly determine fuel consumption savings on the fleet level.

In an embodiment, a user-defined statistical metric is determined for the fleet based on the number of miles vehicles within the fleet were driven during unauthorized use times. For example, it may be permissible to allow 5% of the miles driven by a vehicle to occur outside of authorized use times. In such a case, vehicles having 5% or more of their mileage driven in times not authorized would be identified. In another embodiment, the metric of zero miles driven during not authorized times is set. Using this metric, all vehicles driven during unauthorized times are identified.

In an embodiment, individual vehicles identified as being driven during not authorized time periods can be made aware of the potential fuel savings. In another embodiment, the fleet manager may modify an allowable amount of time that each vehicle in the fleet is allowed to operate outside the authorized time period.

Example 8

Unauthorized Use of the Vehicle Determined by Location of Use

Data warehouse 50 contains a location dataset 90 comprising information on the location of each vehicle at various time points. The vehicle's position may have been determined using a locator system that uses a position determining system, such as the Global Positioning System (GPS), Differential GPS (DGPS), Eurofix DGPS, and the Global Navigation Satellite System (GLONASS). Alternatively, the position of the vehicle can be determined using another type of locating system, such as a system of terrestrial towers that transmit signals to and/or receive signals from a receiver/transmitter located in or on the vehicle. Reference dataset 80 can contain authorized locations for each vehicle, including routes between locations. The dataset can be in the form of geofences or other location comparison system known in the art. The location of a vehicle is compared to authorized locations. The total distance traveled by a vehicle outside of the authorized area for the vehicle is determined. In an embodiment, fuel consumption from the unauthorized location use of the vehicle can be determined from the total distance traveled outside the authorized area and fuel efficiency (miles per gallon) of the vehicle. Fuel efficiency of the vehicle can be obtained from historical dataset 70, from operational conditions dataset 60 containing fuel economy, or a variety of other methods known to one skilled in the art. This procedure determines excess fuel consumption on an individual basis. In an embodiment, excess fuel consumption for the fleet may be calculated by determining the sum of the excess fuel consumption for each vehicle. These calculations may be performed over a number of time periods including, but not limited to days, weeks, months or years.

In an embodiment, a user-defined statistical metric is determined for the fleet based on the number of miles vehicles within the fleet were driven outside of authorized use areas. For example, it may be permissible to allow 10% of the miles driven by a vehicle to occur outside of authorized use areas. In such a case, vehicles having 10% or more of their mileage driven in times not authorized would be identified. In another embodiment, the metric of zero miles driven outside of authorized use areas is set. Using this metric, all vehicles driven outside an authorized use area are identified.

In an embodiment, operators of individual vehicles identified as having excess fuel consumption due to driving the vehicle outside an authorized location of use can be made aware of the potential fuel savings. In another embodiment, the operational characteristics of individual vehicles identified as driving the vehicle outside an authorized location of use can be examined to determine if unauthorized use of the vehicle has changed and desired fuel savings have occurred.

In an embodiment, the fleet manager may modify an allowable amount of mileage each vehicle in the fleet is allowed to travel outside an authorized area. In another embodiment, the fleet manager may modify an allowable distance from an authorized area each vehicle in the fleet is allowed to travel. In a further embodiment, the amount of time a vehicle is outside an authorized area may be determined and used in establishing a metric. The metric used may be based on the properties of the geo-fence and the intended use of the vehicle. For example, a street level geo-fence in a city might be expected to have a higher number of unauthorized uses than a street level geo-fence around a major interstate highway connecting two large cities.

In another embodiment, vehicles identified as traveling outside and authorized area can be evaluated over time to determine if use in non-authorized locations has changed and desired fuel savings have occurred.

Example 9

Driving a Vehicle According to a Schedule that is not Optimized to Consider Factors Affecting Fuel Economy Data warehouse 50 contains an operational conditions dataset 60 and a location dataset 90 on all of the vehicles of the fleet. Contained within that dataset is information on the location of each vehicle over time. In an embodiment, the number of miles driven by each vehicle can be compared to the mileage predicted to be driven by the vehicle when the vehicle is driven according to a schedule prepared by a scheduling system, such as a software program. The scheduling system may be linked to the data warehouse, or to the central station or an application server that performs the fuel calculations. The amount of excess fuel used by the vehicle can be determined by measuring or estimating the fuel used. In another embodiment, number of miles driven by all vehicles within the fleet can be compared to the mileage predicted to be driven by all the vehicles in the fleet when a scheduling system is used. The amount of excess fuel used by the fleet can be determined. In an embodiment, excess fuel consumption for the fleet may be calculated by determining the sum of the excess fuel consumption for each vehicle. In another embodiment, the excess number of miles driven by each vehicle can be aggregated to directly determine fuel consumption savings on the fleet level. This calculation may be performed over a number of time periods including, but not limited to days, weeks, months or years.

In an embodiment, a user-defined statistical metric is determined for the fleet based on the number of miles vehicles within the fleet were driven in excess of the number of miles determined by a scheduling system. For example, the mean number of the miles driven in excess of the number of miles determine using a scheduling system can be selected as a metric.

In an embodiment, the schedule of usage of vehicles within the fleet may be modified to reduce excess fuel consumption.

Example 10

Driving a Vehicle According to Routing that is not Optimized to Consider Factors Affecting Fuel Economy Data warehouse 50 contains an operational conditions dataset 60 and a location dataset 90 on all of the vehicles of the fleet. Contained within that dataset is information on the location of each vehicle over time. In an embodiment, the number of miles driven by each vehicle can be compared to the mileage predicted to be driven by the vehicle when a routing system, such as a software program, is used. The routes generated by the routing system may be stored in the data warehouse or otherwise linked to the central station or application server that performs the fuel calculations. The amount of excess fuel used by the vehicle can be determined by a variety of methods known to one skilled in the art. In another embodiment, number of miles driven by all vehicles within the fleet can be compared to the mileage predicted to be driven by all the vehicles in the fleet when a routing system is used. The amount of excess fuel used by the fleet can be determined. In an embodiment, excess fuel consumption for the fleet may be calculated by determining the sum of the excess fuel consumption for each vehicle. In another embodiment, the excess number of miles driven by each vehicle can be aggregated to directly determine fuel consumption savings on the fleet level. This calculation may be performed over a number of time periods including, but not limited to days, weeks, months or years.

In an embodiment, a user-defined statistical metric is determined for the fleet based on the number of miles vehicles within the fleet were driven in excess of the number of miles determined by a routing system. For example, the mean number of the miles driven in excess of the number of miles determine using a routing system can be selected as a metric.

In an embodiment, the routing of vehicles within the fleet may be modified to reduce excess fuel consumption.

Example 11

Driving a Vehicle in Deviation from Routes that were Optimized to Consider Factors Affecting Fuel Economy Data warehouse 50 contains an operational conditions dataset 60 and a location dataset 90 on all of the vehicles of the fleet. Contained within that dataset is information on the location of each vehicle over time. In an embodiment, the number of miles driven by each vehicle outside of routes optimized by a routing system that considers factors affecting fuel economy, is used. The routes generated by the routing system may be stored in the data warehouse or otherwise linked to the central station or application server that performs the fuel calculations. The amount of excess fuel used by the vehicle can be determined by measuring or estimating the fuel used for the number of miles driven outside of the authorized route. In another embodiment, number of miles driven by all vehicles within the fleet can be compared to the mileage predicted to be driven by all the vehicles in the fleet when an optimized routing system is used. The amount of excess fuel used by the fleet can be determined. In an embodiment, excess fuel consumption for the fleet may be calculated by determining the sum of the excess fuel consumption for each vehicle. In another embodiment, the excess number of miles driven by each vehicle can be aggregated to directly determine fuel consumption savings on the fleet level. This calculation may be performed over a number of time periods including, but not limited to days, weeks, months or years.

In an embodiment, a user-defined statistical metric is determined for the fleet based on the number of miles vehicles within the fleet were driven outside the route determined by a routing system that considers factors affecting fuel economy. For example, the mean number of the miles driven in excess of the number of miles determine using an optimized routing system can be selected as a metric.

In an embodiment, operators of individual vehicles identified as having excess fuel consumption due to driving the vehicle outside the route determined by a routing system that considers factors affecting fuel economy can be made aware of the potential fuel savings. In another embodiment, the operational characteristics of individual vehicles identified as being driven outside the route determined by a routing system that considers factors affecting fuel economy can be examined to determine if routing schedules are being followed and desired fuel savings have occurred.

It is to be understood that the present invention is not limited to the embodiments described above, but encompasses any and all embodiments within the scope of the following claims.

The described techniques have a number of valuable applications. For example, they can enable a fleet operator to automate many costly and time consuming, yet time sensitive operations, such as scheduling certain types of vehicle maintenance. Various maintenance items, such as oil changes, tune-ups and checking tire pressure, can be varied to meet the operational characteristics of each vehicle in the fleet.

This system and the accompanying methods can have implications with regard to nation wide energy usage in that they can be used to help identify and modify use conditions that are less efficient in energy usage, thereby helping reduce dependence on non-renewable energy sources. This system and the accompanying methods can also have implications with regard to nation wide efforts at reducing air pollution, which is linked to vehicular fuel usage.

While the drawings and specific examples given describe exemplary embodiments of the present invention, they serve the purpose of illustration only. For example, the specific configuration of the diagnostic system and communication arrangement may differ depending on the work vehicle or platform or the mode of communication being used. The apparatus of the invention is not limited to the precise details and conditions disclosed. Furthermore, other substitutions, modifications, changes, and omissions may be made in the design, operating conditions, and arrangement of the preferred embodiments without departing from the spirit of the invention as expressed in the appended claims. A number of implementations have been described. Nevertheless, it will be understood that various modifications may be made. Accordingly, other implementations are within the scope of the following claims.

What is claimed is:

1. A method of identifying fuel savings opportunity in a fleet of vehicles, comprising:
   identifying a plurality of modifiable use conditions that represent an opportunity for fuel savings;
   determining fuel consumption attributable to each of a plurality of modifiable use conditions for a plurality of fleet vehicles;
   determining, for each of the plurality of modifiable use conditions, a user-defined statistical metric relating to the fuel consumption for a plurality of vehicles within the fleet that is attributable to each modifiable use condition; and
   determining which vehicles within a fleet represent a fuel savings opportunity by comparing, for each of the vehicles within the fleet, the fuel consumption attributable to each vehicle for each of the plurality of modifiable use conditions with at least one statistical metric relating to the fuel consumption of a plurality of vehicles within the fleet that is attributable to each modifiable use condition.

2. The method of claim 1, wherein said plurality of modifiable use conditions comprise driving a vehicle at a speed exceeding a defined speed, idling a vehicle, driving a vehicle with tire pressure outside a defined range, driving a vehicle without a properly tuned engine, driving a vehicle that is using a grade of motor oil that is not recommended for the vehicle, driving a vehicle with weight in excess of a defined weight, unauthorized use of a vehicle, driving a vehicle according to a schedule that is not optimized to consider factors affecting fuel economy, driving a vehicle according to routing that is not optimized to consider factors affecting fuel economy, and driving a vehicle in deviation from routes that were optimized to consider factors affecting fuel economy.

3. The method of claim 2, wherein determining fuel consumption attributable to the modifiable use condition of exceeding a defined speed comprises determining the marginal fuel consumption when the speed on the vehicle exceeds a set value.

4. The method of claim 3, wherein the marginal fuel consumption is determined based on estimated fuel consumption values obtained from a secondary source or historical data.

5. The method of claim 3, wherein the marginal fuel consumption is determined based on measured fuel consumption during the time when the vehicle exceeded a set value.

6. The method of claim 2, wherein determining fuel consumption attributable to the modifiable use condition of idling the vehicle comprises determining fuel consumption when the vehicle engine is on and the vehicle is stationary.

7. The method of claim 6, wherein the fuel consumption when the engine is on and the vehicle is stationary is determined based on estimated fuel consumption values obtained from a secondary source or historical data.

8. The method of claim 6, wherein the fuel consumption when the engine is on and the vehicle is stationary is determined based on measured fuel consumption.

9. The method of claim 2, wherein determining fuel consumption attributable to the modifiable use condition of driving the vehicle with tire pressure outside a defined range comprises determining the marginal fuel consumption when the vehicle's tire pressure is outside a defined range.

10. The method of claim 9, wherein the marginal fuel consumption is determined based on estimated fuel consumption values obtained from a secondary source or historical data.

11. The method of claim 9, wherein the marginal fuel consumption is determined based on measured fuel consumption.

12. The method of claim 2, wherein determining fuel consumption attributable to the modifiable use condition of driving the vehicle without a properly tuned engine comprises determining the marginal fuel consumption when the vehicle is driven without a properly tuned engine.

13. The method of claim 12, wherein the marginal fuel consumption is determined based on estimated fuel consumption values obtained from a secondary source or historical data.

14. The method of claim 12, wherein the marginal fuel consumption is determined based on measured fuel consumption.

15. The method of claim 2, wherein determining fuel consumption attributable to the modifiable use condition of driving a vehicle that is using a grade of motor oil that is not recommended for the vehicle comprises determining the marginal fuel consumption of the vehicle when the vehicle is driven using a grade of motor oil that is not recommended for the vehicle.

16. The method of claim 15, wherein the marginal fuel consumption is determined based on estimated fuel consumption values obtained from a secondary source or historical data.

17. The method of claim 15, wherein the marginal fuel consumption is determined based on measured fuel consumption.

18. The method of claim 2, wherein determining fuel consumption attributable to the modifiable use condition of driving the vehicle with weight in excess of a defined weight comprises determining the marginal fuel consumption of the vehicle when the vehicle has a weight in excess of a defined weight when driven.

19. The method of claim 18, wherein the marginal fuel consumption is determined based on estimated fuel consumption values obtained from a secondary source or historical data.

20. The method of claim 18, wherein the marginal fuel consumption is determined based on measured fuel consumption.

21. The method of claim 2, wherein determining fuel consumption attributable to the modifiable use condition of unauthorized use of the vehicle comprises determining fuel consumption of the vehicle during a time period of unauthorized use of the vehicle.

22. The method of claim 21, wherein the marginal fuel consumption is determined based on estimated fuel consumption values obtained from a secondary source or historical data.

23. The method of claim 21, wherein the marginal fuel consumption is determined based on measured fuel consumption.

24. The method of claim 2, wherein determining fuel consumption attributable to the modifiable use condition of unauthorized use of the vehicle comprises determining the marginal fuel consumption based on the travel route of a vehicle outside a predefined area.

25. The method of claim 24, wherein the predefined area is established as a geofence.

26. The method of claim 24, wherein the travel route of the vehicle is determined by a locator device.

27. The method of claim 2, wherein determining fuel consumption attributable to the modifiable use condition of driving the vehicle using scheduling of the vehicle which is not optimized considering factors affecting fuel consumption comprises determining marginal fuel consumption of the vehicle when the vehicle is driving using a schedule of the vehicle which is not optimized considering factors affecting fuel consumption.

28. The method of claim 27, wherein the marginal fuel consumption is determined based on estimated fuel consumption values obtained from a secondary source or historical data.

29. The method of claim 27, wherein the marginal fuel consumption is determined based on measured fuel consumption.

30. The method of claim 2, wherein determining fuel consumption attributable to the modifiable use condition of driving the vehicle using routing of the vehicle which is not optimized considering factors affecting fuel consumption comprises determining marginal fuel consumption of the vehicle when the vehicle is driven using routing of the vehicle which is not optimized considering factors affecting fuel consumption.

31. The method of claim 30, wherein the marginal fuel consumption is determined based on estimated fuel consumption values obtained from a secondary source or historical data.

32. The method of claim 30, wherein the marginal fuel consumption is determined based on measured fuel consumption.

33. The method of claim 2, wherein determining fuel consumption attributable to the modifiable use condition of driving the vehicle outside of routes which considered factors affecting fuel economy comprises determining marginal fuel consumption of the vehicle when driving the vehicle outside of routes which considered factors affecting fuel economy.

34. The method of claim 33, wherein the marginal fuel consumption is determined based on estimated fuel consumption values obtained from a secondary source or historical data.

35. The method of claim 33, wherein the marginal fuel consumption is determined based on measured fuel consumption.

36. The method of claim 1, further comprising comparing the plurality of use conditions for a plurality of vehicles in the fleet against each other to determine relative opportunity for fuel savings.

37. The method of claim 1, further comprising evaluating fuel consumption for at least one of a plurality of modifiable use conditions for at least one fleet vehicle over time.

38. The method of claim 1, further comprising evaluating fuel consumption for at least one of a plurality of modifiable use conditions for a plurality of fleet vehicles over time.

39. The method of claim 1, further comprising converting fuel consumption to a monetary value.

40. The method of claim 1, further comprising adjusting at least one of the use conditions in a vehicle.

41. The method of claim 1, further comprising adjusting at least one of the use conditions for the fleet of vehicles.

42. The method of claim 1, further comprising evaluating fuel consumption attributable to identified modifiable use conditions of a vehicle to determine actual changes in the modifiable use condition of a vehicle.

43. The method of claim 1, further comprising evaluating fuel consumption attributable to identified modifiable use conditions of each vehicle within a fleet to determine actual changes in the modifiable use condition of vehicles within the fleet.

44. A system for identifying fuel savings opportunity in a fleet of vehicles comprising:
a computer; and
a data warehouse operably connected to the computer, the data warehouse comprising at least one data set of information concerning the operational condition of the vehicle collected from at least one individual vehicle, at least one data set of vehicle positioning data collected from the same individual vehicle as the first set of information, and at least one data set of user-defined statistical metric relating to fuel consumption;
wherein the computer being adapted to calculate at least one fuel savings opportunity using a plurality of data elements associated with at least two data sets, compare at least one data element associated with at least one operational condition information data set with at least one data element associated with at least one user-defined statistical metric dataset, and report at least one fuel savings opportunity, wherein the report of at least one fuel savings opportunity identifies a fuel savings use condition and an expected fuel savings.

45. The system of claim 44, wherein the data warehouse further comprises at least one data set of fuel price information.

* * * * *